United States Patent [19]

Coulson

[11] Patent Number: 4,860,289

[45] Date of Patent: Aug. 22, 1989

[54] RESET CIRCUIT FOR ELECTRICALLY ISOLATED CIRCUITS COMMUNICATING VIA UART

[75] Inventor: Kenneth A. Coulson, Woodinville, Wash.

[73] Assignee: John Fluke Mfg. Co., Inc., Everett, Wash.

[21] Appl. No.: 110,354

[22] Filed: Oct. 19, 1987

[51] Int. Cl.⁴ ............................................. G06F 11/16
[52] U.S. Cl. ......................................... 371/12; 371/62
[58] Field of Search ................. 371/12, 14, 15, 16, 371/62; 364/200, 900

[56] References Cited

U.S. PATENT DOCUMENTS

| | | | |
|---|---|---|---|
| 4,553,204 | 11/1985 | Hashimoto | 371/12 |
| 4,567,560 | 1/1986 | Polis | 371/12 |
| 4,586,179 | 4/1986 | Sizazi | 371/12 |
| 4,618,953 | 10/1986 | Daniels | 371/12 |
| 4,627,060 | 12/1986 | Huang | 371/12 |
| 4,629,907 | 12/1986 | Kosak | 371/12 |
| 4,670,676 | 6/1987 | Nishitani | 371/12 |
| 4,696,002 | 9/1987 | Schleupen | 371/12 |
| 4,752,930 | 6/1988 | Kitamura | 371/12 |
| 4,775,957 | 10/1988 | Yakuwa | 371/62 |

Primary Examiner—Michael R. Fleming
Attorney, Agent, or Firm—Mikio Ishimaru; Stephen A. Becker

[57] ABSTRACT

A simplified master controller or outguard circuit monitors and controls a plurality of separate slave, or inguard, circuits. Only a single watchdog circuit is provided on the outguard arrangement, with simplified timers being provided on each inguard arrangement to generate a direct hardware reset signal for local microprocessors in the inguard circuits using existing serial communication lines. A break signal generated by the watchdog in the outguard circuit is detected and, without interpretation, converted to the reset signal for the inguard circuit in synchronism with operation of the outguard circuit.

24 Claims, 2 Drawing Sheets

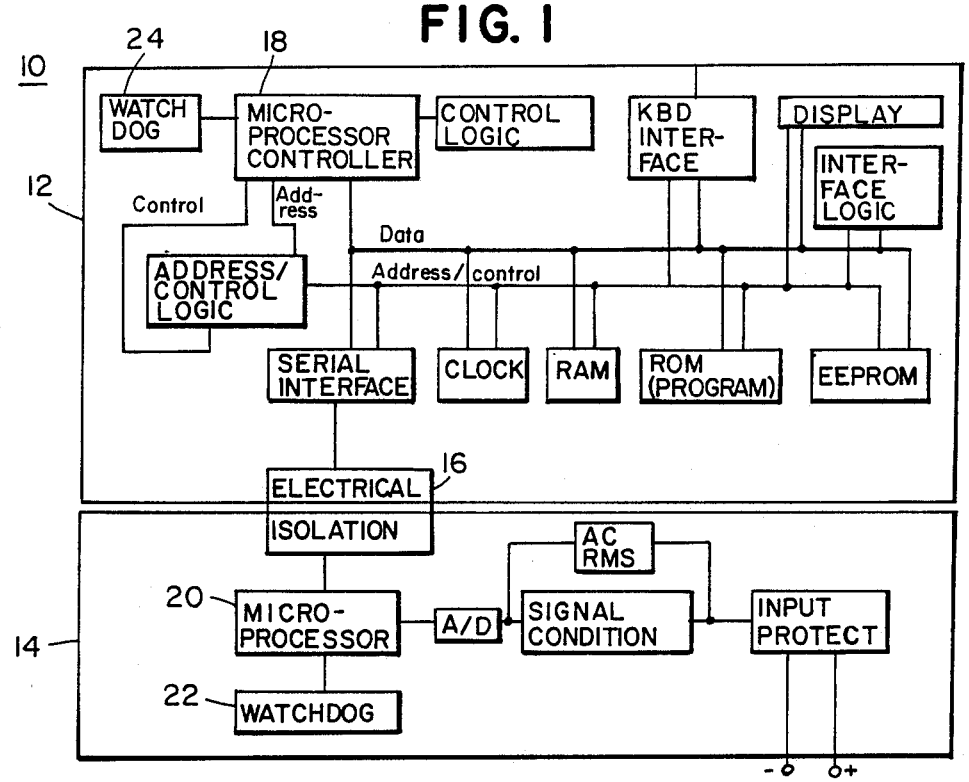
FIG. 1
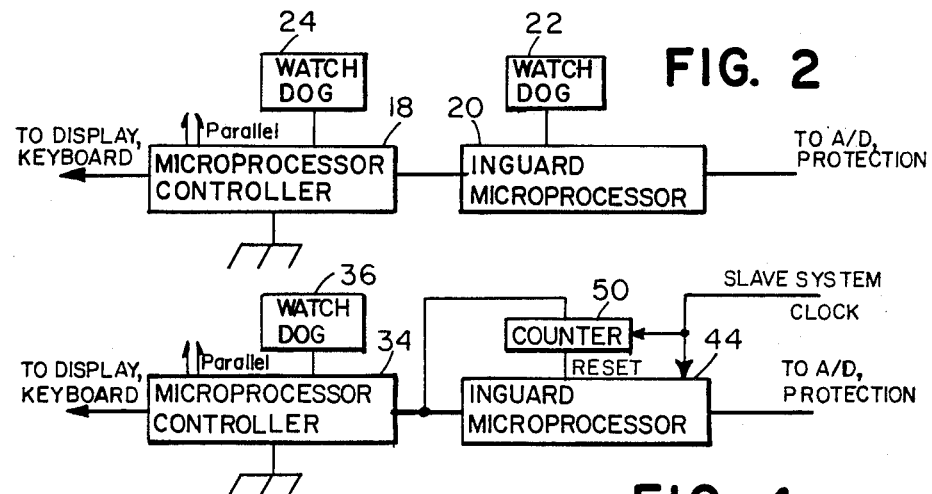
FIG. 2
FIG. 4

RESET CIRCUIT FOR ELECTRICALLY ISOLATED CIRCUITS COMMUNICATING VIA UART

TECHNICAL FIELD

This invention relates to watchdog circuits for plural remotely located circuits, and more specifically to an arrangement wherein a centralized, or master, circuit includes a central watchdog circuit, and has the capability to generate respective hardware reset signals for each of a plurality of slave circuits, to force a reset of a malfunctioning slave circuit. The master circuit generates the reset signal using existing communication links thus minimizing use of components and enabling for the master circuit to generate a very effective signal for controlling slave circuits.

BACKGROUND ART

Because of the increased usage of complex digital circuits and microprocessors as signal processing circuits and for electrical isolation in multimeters and other applications, various circuits functioning cooperatively as a single system are frequently placed on different circuit boards, or are otherwise separated from one another. Such circuits, when in communication with one another, may operate in a master-slave relationship and may communicate via serial links. Where a plurality of circuit boards or circuit locations are involved, there may be a single controlling computer, or master circuit, at one location and plural slaves, or responding circuits, at other locations. In such arrangements it is necessary to determine that each of the circuits is operating properly and, if errant operation is detected due to a software or correctable hardware fault, to be able to force the slave into a known working state.

Accordingly, in the prior art it is known to include for each of the separated circuit structures, i.e., for each circuit board or each remotely located slave, as well as for the master circuit or controller, a watchdog arrangement. Typically, a watchdog circuit is present on each circuit board and monitors the operation of the specific circuit. For example, if operation of the controller is detected to stray outside predetermined limits, or boundaries, for various parameters thereof, it is necessary to reinitiate the controller. Similarly, where slave circuits are detected to be operating improperly, watchdog circuitry provided on each of the slave circuits is used to reinitiate operation.

Where the remote circuits or the slave circuits themselves include microprocessors or similar controllers, each of the "local" microprocessors (i.e., the microprocessors located on the slave circuit boards) includes a program for monitoring the various signal levels and response rates of the circuit components, both hardware and software, to determine proper operation. In the prior art, when it is determined that signal parameter values are beyond the acceptable ranges, or when it is determined that one of the circuits has become inoperative, the appropriate circuit is reinitiated by the watchdog in an attempt to regain control thereover.

However, such locally controlled reinitiation results in synchronization problems among the various slave circuits and between the master controller and the remote, reinitiated, slave circuits. The plural slave circuits must thus be resynchronized with the master controller in order to provide proper system operation, even after appropriate operation of a faulty slave circuit has been reestablished. Locally controlled reinitialization also relies on the local microprocessor being in such an operational state as to be capable of detecting and correcting the problem. This assumption, however, may not be valid, and may lead to significant operational problems.

Another prior art attempt to bring various slave circuits to operation within preset boundaries, parameters and specifications therefor attempts to overcome the synchronization problems by transmitting a break signal from the master controller to the remote slave circuit. Such a break signal typically places the transmission line in the asserted state for a time period much longer than the period for transmissions of a normal bit of information. The recited break signal is typically detected and a status bit is stored by the UART (universal asynchronous receiver/transmitter) to identify a status condition of the remote slave circuit. Reinitiation of the remote circuit occurs upon detection of the status condition of the UART by the local microprocessor of the remote circuit. Thus, the UART must generate an interrupt for the local microprocessor. However, in such an arrangement there remains a requirement for duplicating watchdog circuits and functions on each of the remote circuits, as well as the requirement for a break signal, transmitted from the remote controller as a status command, to be interpreted and translated by the local watchdog or microprocessor to a reset command in order to reinitiate proper operation of the slave circuit. Additionally, the interface between the UART and the microprocessor is required to be operational. Still more significantly, the software must be in an operational state to respond to the interrupt request from the UART. If any of these requirements is not met, the system will fail.

Similarly, if the circuitry required to decode and interpret the break signal is malfunctioning, reinitiation would similarly be impossible since the break signal could not be decoded to a reinitiation command. Moreover, for such a scheme to function properly it must be assumed that the microprocessor is in a proper communication and processing mode so that the received and decoded break signal may be properly interpreted and so that a proper interrupt sequence is initiated together with proper storage of status data.

In situations wherein the local microprocessor, whose serial communications is interrupt driven, is malfunctioning, and is unable to process interrupt vectors properly, such an arrangement would clearly fail to reinitiate operation of the slave circuit. Malfunctioning of the local microprocessor could occur due to software or hardware failure in the microprocessor or due to degraded communication between the master and slave circuits.

Moreover, in many applications microcomputers (microprocessors with on chip RAM, ROM, UARTs) . . .) are used to reduce the component count on the slaves. Typically, such microcomputers do not have full function UARTs and may not be able to receive a break signal. In this case, an even less reliable restart method is used. Thus, some type of command is transmitted over the serial link for the slave to interpret as a command to restart.

It is thus necessary to overcome the difficulties of the prior art and to provide an efficient structure for monitoring operation of a plurality of slave circuits under control of a single, remote, master. It is particularly necessary to provide simplified circuits which, through minimal interpretation of signals sent by the remote master controller, generate a very effective signal in order to reinitiate operation of malfunctioning slave circuits to predetermined states, in synchronism with the remote controller, while minimizing the complexity of the watchdog circuitry, to increase the reliability of the system.

DISCLOSURE OF INVENTION

It is accordingly an object of the present invention to overcome the difficulties of the prior art and to provide an efficient structure for monitoring operation of a plurality of slave circuits under control of a single, remote, master.

It is another object of the invention to provide a simplified structure for reinitiating operation of an inoperative slave circuit, and more particularly to provide reinitiation of the circuit by directly issuing a hardware reset command requiring minimal interpretation and minimal hardware functionality by local microprocessors.

Still a further object of the invention is the provision of circuitry for resetting remote slave circuits to predetermined operational states in response to a break signal generated by a controlling master circuit, and thus to provide synchronized reinitiation of the remote slave circuit.

It is a more particular object of the invention to simplify watchdog circuitry utilized in system circuit distributed on different circuit boards by utilizing a simple counter on the remote slave circuit to detect a break signal issued by the master circuit, and by connecting the counter output directly to a hardware reset terminal for the remote slave circuit.

A specific object of the invention is to provide an improved digital multimeter, wherein an outguard circuit is used to control at least one inguard circuit, the outguard and inguard circuits possibly being located on separate circuit boards, wherein the outguard circuit board includes circuitry for generating a hardware reset signal for the inguard circuit boards.

Yet a further object of the invention is the provision of an improved digital multimeter utilizing outguard and inguard circuits, wherein the inguard circuit includes a reset circuit responsive to a hardware reset signal generated in the outguard circuit for directly resetting circuitry on the inguard circuit board.

Another object of the invention is to use an existing communication serial link to transmit a new reset signal from a master to a slave, thus reducing the number of additional parts and components necessary to improve a watchdog monitoring operation. It is a more detailed object of the invention to provide a counter on an inguard circuit board of a digital multimeter, the counter responsive to a break signal received from an outguard circuit, for generating a signal used as a direct reset signal for a microprocessor on the inguard circuit board.

It is still a further object of the invention to conserve the software resources of the slave circuits by having a direct, hardwired, reset signal from the master circuit control reinitialization of the slave circuit.

In accordance with these and other objects of the invention, there is provided an improvement for a digital multimeter including an outguard circuit and at least one inguard circuit, the outguard and inguard circuits separated from each other physically and electrically, and located on the same or separate circuit boards. The improvement provides a reset signal generator on the outguard circuit board ("master") for generating hardware reset signal for the circuits on the inguard circuit board ("slave"). Moreover, the inguard circuit board includes thereon a reset circuit, responsive to the hardware reset signal generated by the reset signal generator on the outguard circuit board, for resetting circuitry on the inguard circuit board.

Preferably, the reset circuit includes a counter, decoding a reset signal received via the serial communication link from the reset signal generator of the outguard circuit and further receiving a clock signal from a clock generator on the inguard circuit board. The clock signal may be the system clock of the slave circuit. An external crystal may be used to set the frequency of the oscillator, whether within or without the microprocessor. The counter utilizes the clock signal to count the duration of a received signal, thus to detect a hardware reset signal issued by the reset signal generator of the outguard circuit. The counter generates a signal indicative of detection of the hardware reset signal, and the signal is provided to a reset input of a microprocessor on the inguard circuit board in order to reset the microprocessor. The reset signal is preferably transmitted over an existing serial link used for other communications between the outguard and inguard circuits.

In accordance with one aspect of the invention, a plurality of inguard circuit boards is provided, each of the inguard circuit boards including a counter, responsive to an individual, respective, break signal provided by the reset signal generator on the outguard circuit.

In accordance with another aspect of the invention, there is provided an improvement for a system having a master circuit at one location and a plurality of controlled slave circuits at other locations, wherein the controlled slave circuits are in communication with, and controlled by, the master circuit. The improvement for the system provides a circuit for initiating operation of a malfunctioning controlled slave circuit, wherein the initiating circuit includes a reset circuit responsive to a hardware reset signal generated by a reset signal generator on the master circuit.

Preferably, the master circuit controls operation of each of the plurality of controlled slave circuits and the reset signal generator is operable to generate separate hardware reset signals for the separate slave circuits. Moreover, a microprocessor is provided on each of the slave circuits, the slave circuits generating a system clock signal for various circuits of the controlled slave circuit. The reset circuit of each controlled slave circuit includes a counter, receiving the respective hardware reset signals, and other signals, from the master circuit and also receiving the slave circuit system clock signal from the microprocessor of the slave circuit. The counter is operable to count the duration of a received signal from the master circuit in order to indicate reception of a hardware reset signal by generation of a time-out signal.

The time-out signal is provided to a reset input of the microprocessor of the controlled slave circuit in order to reset the microprocessor, as well as any circuits controlled thereby, in response to reception of the hardware reset signal from the master circuit.

In the inventive system there is thus provided an effective, reliable and cost-effective arrangement wherein a master controls a plurality of slave circuits communicating via serial links. By using a simple counter on each slave, error detection is made insensitive to software and hardware failures of local microprocessors, while a single master microprocessor generates hardware reset signals on the slave circuits. Thus, absolute control is maintained over the slave circuits using existing serial communication links. The resulting minimal parts count thus provides increased reliability at reduced cost.

Other objects, features and advantages of the present invention will become readily apparent to those skilled in the art from the following description wherein there is shown and described a preferred embodiment of the invention, simply by way of illustration and not of limitation of the best mode for carrying out the invention. The invention itself is set forth in the claims appended hereto. As will be realized upon examination of the specification, with due reference to the drawings, the present invention is capable of still other, different, embodiments and its several details are capable of modifications is various obvious aspects, all without departing from the invention which is recited in the claims. Accordingly, the drawings and the descriptions provided herein are to be regarded as illustrative in nature and not as restrictive of the invention.

BRIEF DESCRIPTION OF THE DRAWINGS

The accompanying drawings, incorporated in and forming a part of the specification, illustrate several aspects of the present invention and, together with the description, serve to explain the principles of the invention. In the drawings:

FIG. 1 shows a prior art arrangement of a digital multimeter;

FIG. 2 shows a simplified representation of the prior art arrangement of FIG. 1;

FIG. 4 provides a simplified illustration of the arrangement of FIG. 3, and

BEST MODE FOR CARRYING OUT THE INVENTION

Figure 3:
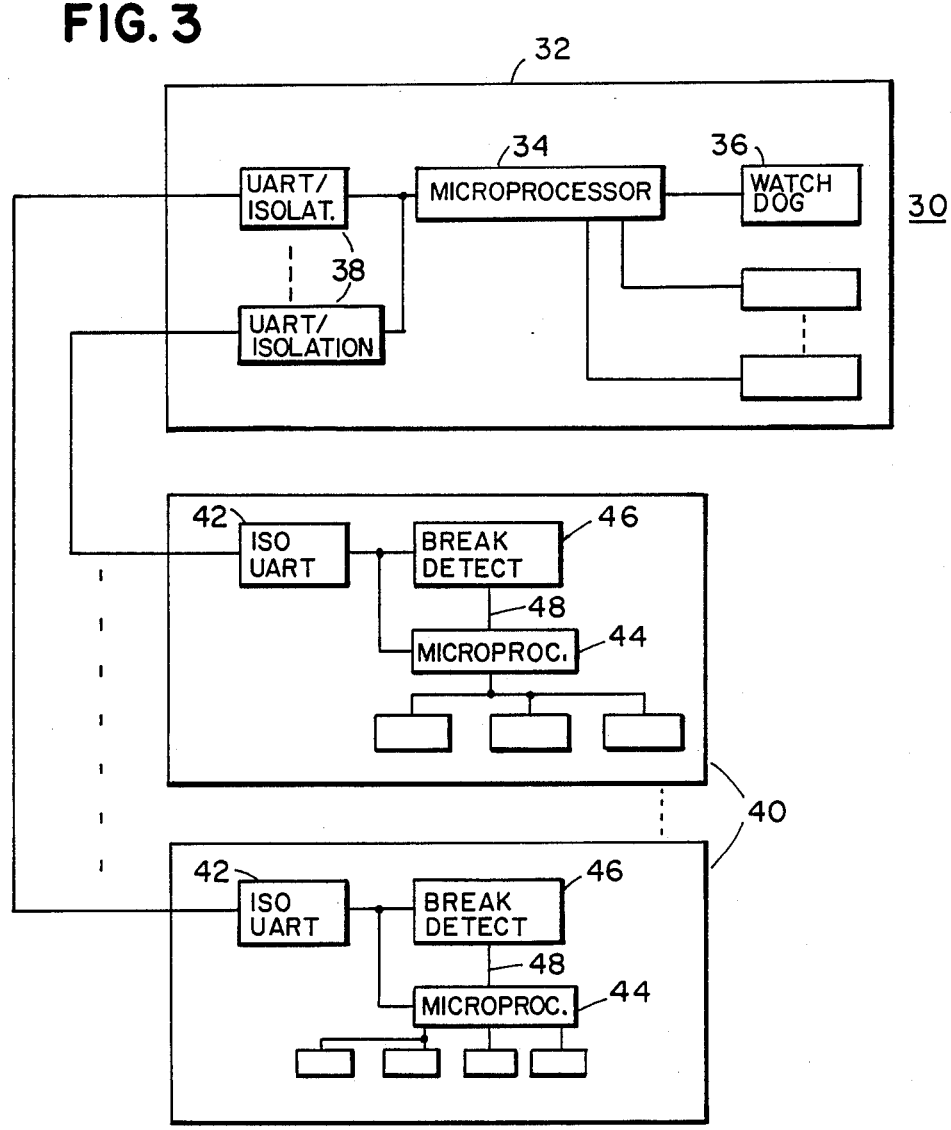
FIG. 3 illustrates an arrangement of inguard and outguard circuits according to the invention.

Referring now to FIG. 1, there is shown a prior art digital multimeter arrangement (DMM) 10, wherein two circuit portions 12 and 14 of the DMM system are provided on two separate circuit boards. The circuits provided on the two circuit boards are isolated by some electrical isolation means 16, which may be a transformer, an infrared communications link, an RF communications link, a fiber optic link, or the like.

The circuitry provided in the prior art system does not form part of the preset invention. However, for illustration of definition of terms, the following brief description is provided.

The two circuit sections utilized in the DMM system are identified as an outguard circuit 12 and inguard circuit 14. The relationship between the outguard and inguard circuits may be thought of as a master/slave relationship, wherein the outguard, or master, circuitry includes a microprocessor 18, acting as a system controller, and the inguard, or slave circuit, 14 may include a separate microprocessor, or microcontroller, 20. The microprocessor 20 is a local processor for the inguard circuit, and is in communication with the remote controller 18, receiving various commands therefrom. The local controlling microprocessor 20 further receives input information from an analog to digital converter, which provides digital signals representing various measured parameters, as is known in the art. Thus, in the inguard circuit 14 there are provided a number of circuits, including for example, input protection circuits, signal conditioning circuits, and special processing circuits for converting the signals measured on a pair of input leads to represent AC signals or RMS values thereof.

The outguard circuit 12 may include therein a display, connected to a pair of data and address/control buses. Also connected to the buses are a keyboard interface, a number of buffers connected thereto by an interface logic circuit, and various memories, including a read/write memory, read only memories including a program memory and other storage, and a clock. A serial interface, also connected to the data and address/control buses, provides communication between the outguard and inguard circuits.

As circuits of the prior art become more and more complex, more powerful controllers are required, to extract more precise or more complex parameters of the signal being examined. Such controllers are more sensitive to signal fluctuations. That is, more secure environments are required for the system controllers. Thus, although the various control functions may be distributed to the inguard circuit, a centralized controller 18 is provided in the outguard circuit which is grounded to earth ground so the outguard can be hooked to other equipment via the interface logic. The inguard circuit for a measurement meter is left floating so that the + and − inputs may be used in any location in the unit under test. Thus, the signals utilized in the floating inguard circuit may provide some fluctuation which could adversely affect the central microprocessor. Accordingly, electrical isolation is used between the outguard and inguard circuits.

As is understood, the central controller on the circuit board of the outguard circuit 12 may be used to control a plurality of inguard circuits on a plurality of circuit boards (not shown). Where a plurality of inguard circuits is utilized, however, it is apparent that savings may be achieved by providing a single, centralized central controller capable of performing a large number of processing tasks. Such an arrangement avoids the need for providing the more sophisticated and powerful processors on each of the individual circuit boards. The overall control architecture becomes simpler and more reliable.

However, each of the inguard circuits may still be provided with a local microprocessor, shown at 20 in FIG. 1, for example, for performing low level control operations or data translations. In a multimeter environment the functions performed by the local microprocessor may include control of analog circuitry, control of switches and relays, routing of signals to correct destinations, and the like. Additionally, self testing procedures may be performed by the local microprocessor. Also, the microprocessor may do some pre-processing on the digital data representation of the signal being examined.

However, even with placement of the controller on the electrically isolated and grounded outguard circuit board, it is still possible for operation of the controller to become corrupted by electrical disturbances. Additionally, the environment in which the local microprocessor 20 operates is more likely to encounter electrical disturbances, and it is thus possible that the local microprocessor may stop functioning because of electrical transient conditions or other difficulties. It has thus been appreciated in the prior art that there must be provided circuitry for reinitiation of operation of a malfunctioning microprocessor or other circuit on the inguard circuit board. Accordingly, there is shown a watchdog circuit 22 on the circuit board of inguard circuit 14 of the prior art. Another watchdog circuit 24 is provided on the circuit board of outguard circuit 12. Similar circuits are provided in the prior art for each of the inguard circuit boards.

In one known prior art approach, the watchdog circuit 22 may be provided as a timer monitoring various signals transmitted between the local microprocessor 20 and the other circuits on the inguard circuit board. Upon detection of a cessation of communication on the inguard circuit board, a particular command is generated in an attempt to inform microprocessor 20 of the malfunction and to cause the microprocessor to resume normal operations in response to the command. Of course, the element indicated in FIG. 1 as a separate block 22 may instead be part of the operating software controlling microprocessor 20. In other words, the microprocessor itself may keep track of various conditions on the inguard circuit and may take appropriate action upon detection of failure. However, such an arrangement possibly detracts from the operating efficiency of the local microprocessor 20.

A similar arrangement, wherein either a hardware or software watchdog is utilized, is to be understood as being encompassed by the watchdog circuit 24 shown on the outguard circuit.

It is to be recognized, however, that neither the above described functions performed by the central controller or the inguard controller, nor the electrical isolation provided therebetween, are necessary for practicing the inventive concept hereinafter described.

Referring now to FIG. 2, the prior art arrangement is shown without regard to the specific functions performed by the master and slave components of the operating system. Essentially, the microprocessor 18 is shown as having a parallel communication path to the external world, such as may be provided by an IEEE 488 interface, for example. The inguard microprocessor 20, is symbolically shown as connected thereto. It should be recognized that the connection is frequently isolated. In a multimeter that has an interface such as IEEE 488, which is hooked to external equipment, it is common for the interface to be referenced to earth ground. The analog measurement circuitry, if it is floating so that its differential inputs may be hooked to any point in the unit under test, must be electrically isolated from the earth potential interface logic. The prior art arrangement of utilizing duplicated separate watchdog circuits 22 and 24 on both inguard and outguard circuits is illustrated in the arrangement of FIG. 2.

In a separate approach utilized in the prior art, the outguard circuit board 12, and the central or master controller 18 thereon, provide commands to the remote or slaved microprocessor 20 in an attempt to reinitiate proper operation and sequences. Thus, an interrupt command, often in the form of a non-maskable interrupt provided via a "break" on the communication link, may be transmitted from the central controller 18 to a local microprocessor 20 of an inguard circuit which is detected as having failed in operation. Nonetheless, even a non-maskable interrupt requires interpretation by the local microprocessor. Moreover, such interpretation can only be correct if no corruption of the command occurs in the communication link between the outguard and inguard circuits. Accordingly, as has been hereinabove described, the prior art arrangement suffers from a number of deficiencies. For example, the operations software of microprocessor 20 must be in such a state that it can respond to the command from 18. Possible software or hardware problems may prevent this.

Referring now to FIG. 3, there is shown an arrangement of a plurality of separate circuits, in the form of a master control circuit and a plurality of slave circuits, alternatively referred to as an outguard circuit and a plurality of inguard circuits, respectively, wherein the inventive concept is incorporated. The arrangement of interconnection of a master circuit and remotely located slave circuits is generally identified by the reference numeral 30. The outguard, or master circuit is shown at 32. The circuitry is arranged on a circuit card, and includes a microprocessor 34, a watchdog circuit 36, and a plurality of UART and isolation arrangements 38 for communication with the remotely located inguard, or slave circuits 40. Miscellaneous other circuits are provided on the circuit card for the outguard master circuit, and are not identified by specific reference numerals. The miscellaneous circuits may be provided to perform particular functions in accordance with the specific application to which the inventive concept is applied, and may be of the type illustrated in the prior art application of an outguard/inguard arrangement illustrated in FIG. 1.

The inguard circuits 40 are also illustrated as having a number of miscellaneous unlabelled circuits thereon. The unlabelled circuits again are presented as an illustration of the applicability of the inventive concept to any use and the fact that the invention is not limited to a particular application. However, as is noted in the illustration of each of the inguard circuits, there is provided a UART including an isolation arrangement thereon, shown at 42. Further, a local microprocessor 44 is illustrated in each inguard circuit.

A significant facet of the present invention, overcoming the difficulties of the prior art, is provided in the form of a break detecting circuit 46. The function of break detecting circuit 46 is to generate a reset signal to reset microprocessor 44. The reset signal is provided on output 48 of the break detecting circuit.

Thus, the embodiment of FIG. 3 utilizes a simple break detecting circuit which, as will be appreciated from the following discussion, is provided in the form of a simple counter.

As has been previously described, the watchdog circuit 36 may, in fact, be a software function programmed for microprocessor 34. At any rate, upon detection of signal values beyond normal operational limits therefor, or upon detection of an inappropriately long pause in communication between the outguard and inguard circuits, watchdog circuit 36 generates a hardware reset signal for transmission to the errant inguard circuit. The hardware reset signal is sent to the particular inguard circuit detected as malfunctioning, in the form of a break signal wherein the signal level is tied to a fixed value for a predetermined time period.

That is, upon detection of an out of limits signal or upon detection of failure of an inguard circuit to respond within a predetermined time interval, the break signal is generated wherein an output signal level of zero volts, for example, is generated for an extended period of time. This allows the existing serial communication link hardware to be used in a system control fashion to generate a reset for the respective slave circuit. Thus, the outguard circuit asserts the transmit line therefrom to the inguard circuit for a long interval, such as 250 milliseconds. Length of the interval is chosen to be significantly longer than the time interval for transmission of a byte of information, which takes approximately 1.4 milliseconds at a transmission rate of 9600 baud.

Upon detecting the break signal, break detecting circuit 46 generates a reset signal on output line 48 without requiring any interpretation of the break signal, and provides the same directly to microprocessor 44 (and, if necessary, to associated control logic). The microprocessor, in response to the direct reset signal, thus directly enters a reset mode, again without a need to interpret the signal, thus reducing the possibility that the signal could be ignored. For a mircoprocessor the reset signal provides the highest probability of any signal, assuming minimum hardware functionality, to put the microprocessor into a known operating state.

Such operation differs from the prior art circuit in FIGS. 1 and 2, wherein plural watchdog circuits are required. The arrangement is also distinguished from circuits utilizing UART's for communication wherein the master controller sends a command for the slave microprocessor, since this type of communication is subject to deterioration and faulty transmission over the communication link and further may be ignored by a microprocessor which is inoperative and in a hold state, for example. Accordingly, the arrangement of the present invention does not require any interpretation of a command but rather only the detection of the same, and generation of a hardware reset signal responsive thereto. It should be noted that the arrangement of FIG. 3 permits use of microprocessor 44 to generate any control signal for resetting the miscellaneous circuitry provided on the inguard circuit card. However, the break detecting circuit 46 may provide the reset signal therefrom directly to one or more of the miscellaneous operating circuits on the inguard circuit card along with the microprocessor.

Referring now to FIG. 4, the inventive arrangement of FIG. 3 is illustrated in a simplified manner. Thus, microprocessor controller 34 of the outguard circuit communicates via a serial link such as an RS232 interface, for example, with the local microprocessor 44 of the inguard circuit. The transit line from microprocessor 34 is monitored by break detector 46 (shown in FIG. 3) which is shown in FIG. 4 in the form of a counter 50. Upon detection of the time period representing a break signal, counter 50 generates a time-out signal which is provided to the reset input of inguard microprocessor 44, thus directly resetting the microprocessor. The arrangement of FIG. 4, similarly to the arrangement for FIG. 2, illustrates microprocessor 34 as having an earth ground, to provide enhanced stability and control thereover, as well as an ability to interface to external equipment which is referenced to earth ground. The microprocessor is further shown as communicating with display and keyboard sections, similarly to the prior art application of the microprocessor controller shown in FIG. 2. Inguard microprocessor 44 is left floating, and is further illustrated as communicating with analog to digital conversion circuitry, protection circuitry and the like.

Thus, the arrangement of FIG. 4 applies the inventive concept, in a simplified illustration, to a digital multimeter. As has been previously noted, however, the inventive concept may be similarly applied to any arrangement utilizing a controller and a plurality of controlled circuits communicating therewith. Thus, the inguard microprocessors and other circuits may be earth grounded similarly to the outguard microprocessor. In the measurement environment it is advantageous to maintain the inguard microprocessor floating inasmuch as the microprocessor receives signals which are input from circuits under test which may themselves be at very high voltages. When the inguard microprocessor and other circuitry is left floating, however, the possibility of ground loops is eliminated, as are other potential problem sources. In a multimeter in which the measurement circuitry did not float, the negative (−) input lead would be referenced (hooked) to earth ground. Thus, this lead could not be placed at any point in the unit under test (doing so would hook said point to earth ground, possibly a dangerous or destructive condition). This would eliminate much of the utility of a differential multimeter.

A comparison of the arrangements shown in FIGS. 2 and 4 illustrates yet a further advantage of the present invention. More particularly, since counter 50 is responding to a break signal transmitted from microprocessor 34 to microprocessor 44, the break signal is essentially synchronized with the transmitting microprocessor 34. The reset signal (time-out signal) generated by counter 50 is thus synchronized with the transmitting microprocessor. Accordingly, the entire reset operation is synchronized with the master controller. It is thus unnecessary to provide further synchronization signals and further synchronization hardware to bring the inguard circuits back into synchronization with the outguard circuit.

Figure 5:
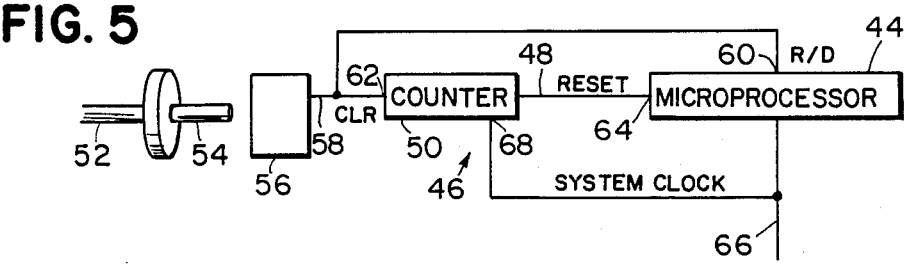
FIG. 5 illustrates a detail of a circuit implementing the inventive concept.

Referring now to FIG. 5, there is illustrated in greater detail a circuit implementing the inventive concept for the inguard circuit card.

Specifically, for an arrangement wherein isolation is achieved by fiber optic communication, there is shown an optical fiber 52, representing the transmit line from the remote microprocessor 34. Optical fiber 52 terminates in a coupling arrangement 54 at a standard UART fiber optic receiver 56. The receiver 56 converts the optical signals to electrical signals provided on an output line 58. The signals are provided to a receive data terminal 60 of microprocessor 44. Additionally, the break detecting circuit 46, in the form of counter 50, provides an output time-out signal on output line 48 to the reset terminal 64 of microprocessor 44. The system clock line 66, provides the system clock to the clock terminal 68 of counter 50. As previously noted, the clock may be generated by microprocessor 44.

In operation, output line 58 of the UART fiber optic receiver 56 is at a high voltage level. The high voltage level on output line 58 is used to hold counter 50 in a cleared mode. When a break signal is transmitted as an extended zero level signal, the counter 50 is not cleared prior to expiration of a predetermined time period determined by the system clock provided at input 68 and by a particular predetermined count. Expiration of different time periods is indicated on one of a plurality of output lines of the counter.

Thus, upon expiration of the predetermined time period, a time-out signal is provided by counter 50 on output line 48 to reset microprocessor 44. Of course, any signal transitions representing information bits transmitted by the outguard microprocessor 44 similarly drop the voltage level on output line 58 to the low or zero level. However, as hereinabove noted, such information transmission is achieved utilizing extremely short pulses. Thus, upon transmission of each bit of information a positive transition is provided on output line 58 and the counter 50 is cleared thereby.

By selecting a break interval significantly longer than the bit transmission time, both failure of communication between the remote microprocessor and a break signal transmitted thereby are detected and a time-out signal is generated by counter 50 to provide a direct reset input to microprocessor 44. If necessary, the output of counter 50 may be inverted to reset the microprocessor. Thus the serial communicating link hardware is used for two purposes, including data transmission and transmission of a break signal to reset the slave circuit. It is to be recognized that neither the functions performed by the central controller and the inguard, nor the electrical isolation provided therebetween are necessary for practicing the inventive concept herein described. It is thus seen that counter 50 monitors only the incoming signal from the outguard circuit, rather than monitoring operation of each of a plurality of circuits on the inguard circuit card.

The present invention thus eliminates complexities of circuitry and software, and replaces the same by a simplified circuit component in the form of a timer to provide reset signals to the inguard microprocessor. Unlike interrupt signals and commands transmitted by the outguard microprocessor, the reset signals generated by the timer used in the present invention cannot be ignored by the inguard microprocessor. Moreover, the reset signal is generated in synchronism with the break signal generated by the microprocessor controller. Accordingly, any inguard circuit being reinitiated in accordance with the present invention is initiated in synchronism with the outguard circuit so that additional synchronization techniques and circuitry are not required or are simpler to implement. Only a single watchdog is required, provided on the outguard circuit, to monitor the operation of the master controller. Additionally, the watchdog performs conventional watchdog functions for circuitry on the outguard circuit card. Upon detecting that information received from the inguard circuit is not as expected, the software within the outguard microprocessor causes generation of the break signal which is transmitted to the inguard to cause reconfiguration of the inguard circuit to a reset condition. Such an arrangement is completely transparent to a user who may detect a slight delay in responsiveness of the inguard but would otherwise be unaware of difficulties therewith.

For example, when a response is expected by the outguard from the inguard circuit within a time period, such as 100 milliseconds, after 150 milliseconds pass by without response a break signal may be generated. The inguard is reconfigured to the reset state in order to initiate again a measurement process, for example, thus providing the desired measurement approximately 150 milliseconds later than initially expected. The results of the measurement are displayed by the circuitry on the outguard circuit card. The user would thus be unaware of the difficulties other than the 150 millisecond delay in generating a display. If reset signals are transmitted an inordinate number of times to an inguard, it may be concluded that a difficulty exists with the serial communication link or that the hardware on the inguard circuitry has failed and the inguard may be isolated. In one format, a message is provided for display by the circuit structure illustrated in FIG. 1, for example, to indicate that the specific inguard circuit is inoperative and requires service.

Although the foregoing description describes generation of a break signal by the watchdog arrangement on the outguard circuit in response to excessive delays or improper signal levels, it should be appreciated that such break signals may also be generated in response to the transmission errors.

Thus, if checksum or other error detecting information is transmitted from the outguard microprocessor to the inguard or vice versa, requiring an echo from the inguard microprocessor, for example, failure of the inguard to respond or indication of a checksum error may be used to retransmit the information. Repeated errors in information transmission protocol, or even a single checksum error, may be used by the outguard microprocessor and/or watchdog 36 to generate the break signal. Upon transmission of the break signal, a reset signal is generated by counter 50 for resetting inguard microprocessor 44 and the remaining circuits on the inguard circuit card. Accordingly, various switches, relays, and the like, which are present on or controlled by the inguard circuits, are reset to predetermined states without requiring interpretation of a break command from the outguard microprocessor.

Any number of inguard circuits, or controlled slave circuits, may thus be in communication with a single outguard, or master, circuit.

The foregoing description of the preferred embodiment of the invention has been presented for purposes of illustration and description and is not intended to be exhaustive or to limit the invention to the precise forms disclosed, since many obvious modifications and variations are possible in the light of the above teaching. The embodiment was chosen and described in order best to explain the principles of the invention and its practical application, thereby to enable others skilled in the art best to utilize the invention in various embodiments and with various modifications as are suited to the particular use contemplated. It is intended that the scope of the invention be defined by the claims appended hereto, when interpreted in accordance with the full breadth to which they are fairly and legally entitled.

I claim:

1. In a digital multimeter having an outguard circuit and at least one inguard circuit, said outguard circuit and said inguard circuit separated from one another, said multimeter including structure for detecting occurrence of operating errors in said outguard and inguard circuits and means for initiating the inguard circuit to function properly, the improvement comprising:

reset signal generating means in said outguard circuit for generating a hardware reset signal in response to a detected operating error in said inguard circuit and for transmitting the reset signal to said inguard circuit, said inguard circuit including reset means responsive to said hardware reset signal generated in said outguard circuit for resetting circuitry of said inguard circuit thereby initiating operation thereof to a predetermined state of operation.

2. An improved digital multimeter as recited in claim 1 further comprising electrical isolating means for electrically isolating circuits of said outguard circuit from circuits of said inguard circuit board.

3. An improved digital multimeter as recited in claim 1 wherein said multimeter comprises an outguard circuit board an a plurality of inguard circuit boards, said outguard circuit controlling operation of each of said plurality of inguard circuit boards, said reset signal generating means in said outguard circuit being operable for generating separate hardware reset signals for resetting separate ones of said plurality of inguard circuits.

4. An improved digital multimeter as recited in claim 3 wherein each of said plurality of inguard circuit boards comprises clock means generating a clock signal for circuits on said each inguard circuit board, said reset means on each said inguard circuit comprises counter means receiving respective signals from said reset signal generating means on said outguard circuit board and receiving said clock signal from said clock means for counting a duration of a received signal to detect a hardware reset signal from said reset signal generating means and for generating a time-out signal indicative of detection of said hardware reset signal.

5. An improved digital multimeter as recited in claim 4 wherein each said reset means of said inguard circuit further comprises microprocessor means and means for providing said time-out signal to a reset input of said microprocessor means on said inguard circuit board thereby resetting said microprocessor means and circuits controlled thereby in response to said hardware reset signal from said outguard circuit.

6. An improved digital multimeter as recited in claim 1 wherein said inguard circuit comprises microprocessor means and clock generating means for generating a clock signal for circiuits of said inguard circuit, said reset means of said inguard circuit comprises counter means receiving signals from said reset signal generating means of said outguard circuit and receiving said clock signal for counting a duration of a received signal to detect a hardware reset signal from said reset signal generating means and for generating a timing signal indicative of detection of said hardware reset signal.

7. An improved digital multimeter as recited in claim 6 wherein said reset means of said inguard circuit further comprises means for providing said timing signal to a reset input of said microprocessor means of said inguard circuit thereby resetting said microprocessor means and circuits controlled thereby in response to said hardware reset signal from said outguard circuit.

8. An improved digital multimeter as recited in claim 1 further comprising a serial link means for communication of data between said outguard and inguard circuits, said reset signal generating means transmitting said reset signal to said reset means of said inguard circuit via said serial link means.

9. In a system having a master circuit means at one location, and a plurality of controlled slave circuits at other locations, said controlled slave circuits in communication with and controlled by said master circuit means, said system including structure for detecting occurrence of operating errors at least in circuits of said controlled slave circuits, and means for initiating a controlled slave circuit detected as having an error to function properly, the improvement comprising:

reset signal generating means at said master circuit means location for generating a hardware reset signal in response to a detected operating error in one of said controlled slave circuits and for transmitting the reset signal to said controlled slave circuit, said controlled slave circuit including reset means responsive to said hardware reset signal generated by said reset signal generating means of said master circuit means for resetting circuitry at said controlled circuit thereby initiating operation thereof to a predetermined state of operation.

10. An improved master-slave system as recited in claim 9 further comprising isolating means for electrically or physically isolating said master circuit means from said controlled slave circuits.

11. An improved master-slave system as recited in claim 9 wherein said system comprises a plurality of controlled slave circuits, said master circuit means operable for controlling operation of said plurality of controlled slave circuits, said reset signal generating means in said master circuit means being operable for generating separate hardware reset signals for resetting separate ones of said plurality of controlled slave circuits.

12. An improved master-slave system as recited in claim 11 wherein each said controlled slave circuit comprises microprocessor means and clock means for providing a system clock signal to circuits of said controlled slave circuit, said reset means of each said controlled slave circuit comprises counter means receiving respective signals from said reset signal generating means of said master circuit means and receiving said system clock signal from said clock means of said controlled slave circuit for counting a duration of a received signal to detect a hardware reset signal from said reset signal generating means and for generating a time-out signal indicative of detection of said hardware reset signal.

13. An improved master-slave system as recited in claim 12 wherein said reset means of each said controlled slave circuit further comprises means for providing said time-out signal to a reset input of said microprocessor means of said controlled slave circuit thereby resetting said microprocessor means and circuits controlled thereby in response to said hardware reset signal from said master circuit means.

14. An improved master-slave system as recited in claim 9 wherein said controlled slave circuit comprises microprocessor means and clock means for providing a clock signal to circuits of said controlled slave circuit, said reset means of said controlled slave circuit comprises counter means receiving signals from said reset signal generating means of said master circuit means and receiving said clock signal from said clock means for counting a duration of a received signal to detect a hardware reset signal from said reset signal generating means and for generating a time-out signal indicative of detection of said hardware reset signal.

15. An improved master-slave system as recited in claim 14 wherein said reset means of said controlled slave circuit further comprises means for providing said time-out signal to a reset input of said microprocessor means of said controlled slave circuit thereby resetting said microprocessor means and circuits controlled thereby in response to said hardware reset signal from said master circuit means.

16. An improved digital multimeter as recited in claim 9 further comprising a serial link means for communication of data between said master circuit means and said slave circuit, said reset signal generating means transmitting said reset signal to said reset means of said slave circuit via said serial link means.

17. In a system having a master circuit means at one location, and a plurality of controlled slave circuits at other locations, an information communication link between said master circuit means and said controlled slave circuits, said controlled slave circuits in communication with and controlled by said master circuit means by transmission of information over said information communication link, said system including structure for detecting occurrence of operating errors at least in circuits of said controlled slave circuits, and means for initiating a controlled slave circuit detected as having an error to function properly, the improvement comprising:

reset signal generating means at said master circuit means location for generating a hardware reset signal in response to an operating error detected in one of said slave circuits by said structure for detecting occurrence of operating errors, transmitting means for transmitting said hardware reset signal from said master circuit means to said one of said slave circuits via said information communication link between said master circuit means and said slave circuit, said controlled slave circuit including reset means responsive to said hardware reset signal generated by said reset signal generating means of said master circuit means for resetting circuitry at said controlled circuit thereby initiating operation thereof to a predetermined state of operation.

18. An improved system as recited in claim 17 wherein said information communication link comprises a serial communication link.

19. An improved system as recited in claim 18 wherein said structure for detecting occurrence of operating errors consists essentially of a single error detecting circuit at said one location and connected to said master circuit means for detecting errors in each of said plurality of controlled slave circuits.

20. An improved system as recited in claim 17 wherein said structure for detecting occurrence of operating errors consists essentially of a single error detecting circuit at said one location and connected to said master circuit means for detecting errors in each of said plurality of controlled slave circuits.

21. An improved system as recited in claim 20 wherein said reset signal generating means at said master circuit means location generates said reset signal in synchronism with said master circuit means, and wherein said reset means of said controlled slave circuit comprises a counter means responsive to a clock signal and to said reset signal by generating a time-out signal, whereby said controlled slave circuit is synchronized with said master circuit means upon being reset by said reset signal.

22. An improved system as recited in claim 21 wherein said information communication link comprises a serial communication link including an optical fiber communication path.

23. An improved system as recited in claim 20 wherein said reset signal generating means at said master circuit means location is operable for generating said hardware reset signal by asserting a predetermined voltage level on said information communication link for a time in excess of a predetermined time.

24. An improved system as recited in claim 17 wherein said reset signal generating means at said master circuit means location is operable for generating said hardware reset signal by asserting a predetermined voltage level on said information communication link for a time in excess of a predetermined time.

* * * * *